United States Patent
Rogers et al.

(10) Patent No.: US 9,041,954 B2
(45) Date of Patent: May 26, 2015

(54) IMPLEMENTING CONSISTENT BEHAVIOR ACROSS DIFFERENT RESOLUTIONS OF IMAGES

(75) Inventors: Daniel Stuart Rogers, Concord, CA (US); Matthew Donald Gaubatz, Seattle, WA (US); Stephen Laurence Laszlo, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 786 days.

(21) Appl. No.: 13/154,828

(22) Filed: Jun. 7, 2011

(65) Prior Publication Data

US 2012/0314247 A1 Dec. 13, 2012

(51) Int. Cl.
| | |
|---|---|
| G06F 3/12 | (2006.01) |
| G06K 9/40 | (2006.01) |
| G06K 9/00 | (2006.01) |
| G06T 7/00 | (2006.01) |
| H04N 1/393 | (2006.01) |
| H04N 1/62 | (2006.01) |

(52) U.S. Cl.
CPC ............ *G06T 7/0042* (2013.01); *H04N 1/3935* (2013.01); *H04N 1/624* (2013.01); *G06T 2207/20016* (2013.01); *G06T 2207/30216* (2013.01)

(58) Field of Classification Search
None
See application file for complete search history.

(56) References Cited

U.S. PATENT DOCUMENTS

| | | | |
|---|---|---|---|
| 5,130,789 A | 7/1992 | Dobbs et al. | |
| 5,432,863 A | 7/1995 | Benati et al. | |
| 5,748,764 A | 5/1998 | Benati et al. | |
| 6,016,354 A | 1/2000 | Lin et al. | |
| 6,252,976 B1 | 6/2001 | Schildkraut et al. | |
| 6,278,491 B1 | 8/2001 | Wang et al. | |
| 6,292,574 B1 | 9/2001 | Schildkraut et al. | |
| 6,577,751 B2 | 6/2003 | Yamamoto | |
| 6,728,401 B1 | 4/2004 | Hardeberg | |
| 6,873,743 B2 | 3/2005 | Steinberg | |

(Continued)

FOREIGN PATENT DOCUMENTS

| | | |
|---|---|---|
| CN | 1750017 A | 3/2006 |
| CN | 101620679 | 1/2010 |

(Continued)

OTHER PUBLICATIONS

Burt, P.J.; "Fast filter transforms for image processing"; Computer Vision, Graphics and Image Processing; 1981; pp. 20-51; vol. 16.

(Continued)

*Primary Examiner* — Marcus T Riley
(74) *Attorney, Agent, or Firm* — Van Cott, Bagley, Cornwall & McCarthy, P.C.

(57) ABSTRACT

A method of implementing consistent behavior across different resolutions of images comprises retrieving a list of image enhancement operations applied to an available image, creating, based on image resolution and use case, from the available image, a pre-processed image that simulates the image enhancement operations intended for the available image, performing an image analysis operation on the pre-processed image to obtain a list of artifacts, creating a modified list of artifacts that are mapped to the coordinate system of the available image, applying the modified list of artifacts and retrieved list of image enhancement operations to the available image to obtain a corrected image, and outputting the corrected image to an output device.

20 Claims, 6 Drawing Sheets

(56) References Cited

U.S. PATENT DOCUMENTS

| | | | |
|---|---|---|---|
| 6,914,694 B1* | 7/2005 | Ichikawa et al. | 358/1.15 |
| 7,116,820 B2 | 10/2006 | Luo et al. | |
| 7,155,058 B2 | 12/2006 | Gaubatz et al. | |
| 7,174,034 B2 | 2/2007 | O'Callaghan | |
| 7,184,168 B2 | 2/2007 | Beckman et al. | |
| 7,317,815 B2 | 1/2008 | Steinberg et al. | |
| 7,333,653 B2 | 2/2008 | Luo et al. | |
| 7,343,028 B2 | 3/2008 | Ioffe et al. | |
| 7,397,969 B2 | 7/2008 | Enomoto et al. | |
| 7,415,165 B2 | 8/2008 | Itagaki et al. | |
| 7,424,164 B2 | 9/2008 | Gondek et al. | |
| 7,447,365 B2 | 11/2008 | Ferlitsch | |
| 7,450,756 B2 | 11/2008 | Bloom et al. | |
| 7,454,040 B2 | 11/2008 | Luo et al. | |
| 7,460,707 B2 | 12/2008 | Nishi | |
| 7,536,036 B2 | 5/2009 | Steinberg et al. | |
| 7,548,647 B2* | 6/2009 | Whitman | 382/167 |
| 7,585,085 B1 | 9/2009 | Holman | |
| 7,587,085 B2 | 9/2009 | Steinberg et al. | |
| 7,606,417 B2* | 10/2009 | Steinberg et al. | 382/173 |
| 7,747,071 B2 | 6/2010 | Yen et al. | |
| 7,777,912 B2 | 8/2010 | Caine | |
| 7,830,418 B2 | 11/2010 | Ulichney et al. | |
| 7,920,284 B2 | 4/2011 | Yamada et al. | |
| 7,953,250 B2 | 5/2011 | Steinberg et al. | |
| 8,014,013 B2 | 9/2011 | Owen et al. | |
| 8,045,795 B2 | 10/2011 | Umeda | |
| 8,073,286 B2* | 12/2011 | David et al. | 382/275 |
| 8,170,332 B2 | 5/2012 | Wang et al. | |
| 8,213,737 B2* | 7/2012 | Steinberg et al. | 382/275 |
| 8,249,321 B2 | 8/2012 | Matsuhira | |
| 8,254,674 B2* | 8/2012 | Nanu et al. | 382/167 |
| 8,358,838 B2 | 1/2013 | Matsushita et al. | |
| 8,373,875 B2 | 2/2013 | Ferlitsch et al. | |
| 8,422,780 B2 | 4/2013 | Ciuc et al. | |
| 8,446,494 B2 | 5/2013 | Gaubatz et al. | |
| 8,553,949 B2* | 10/2013 | Steinberg et al. | 382/118 |
| 2002/0136450 A1 | 9/2002 | Chen et al. | |
| 2003/0007687 A1 | 1/2003 | Nesterov et al. | |
| 2003/0068084 A1 | 4/2003 | Kinjo et al. | |
| 2004/0070598 A1 | 4/2004 | Enomoto | |
| 2005/0232490 A1 | 10/2005 | Itagaki et al. | |
| 2006/0008169 A1 | 1/2006 | Deer et al. | |
| 2006/0039690 A1* | 2/2006 | Steinberg et al. | 396/155 |
| 2006/0204052 A1 | 9/2006 | Yokouchi | |
| 2007/0036438 A1 | 2/2007 | Thakur | |
| 2008/0043121 A1* | 2/2008 | Prilutsky et al. | 348/239 |
| 2008/0075385 A1* | 3/2008 | David et al. | 382/275 |
| 2008/0112613 A1 | 5/2008 | Luo et al. | |
| 2009/0244614 A1 | 10/2009 | Matsuhira | |
| 2010/0054592 A1* | 3/2010 | Nanu et al. | 382/167 |
| 2011/0001850 A1 | 1/2011 | Gaubatz et al. | |
| 2011/0019912 A1 | 1/2011 | Yen et al. | |
| 2011/0142337 A1 | 6/2011 | Deonarine et al. | |
| 2012/0020557 A1 | 1/2012 | Gaubatz et al. | |
| 2012/0134546 A1 | 5/2012 | Oicherman et al. | |
| 2012/0263378 A1 | 10/2012 | Gaubatz et al. | |
| 2012/0314247 A1 | 12/2012 | Rogers et al. | |
| 2013/0070263 A1 | 3/2013 | Gaubatz et al. | |

FOREIGN PATENT DOCUMENTS

| | | |
|---|---|---|
| WO | WO-03071484 A1 | 8/2003 |
| WO | WO-2005022466 A2 | 3/2005 |

OTHER PUBLICATIONS

A. P. Witkin, "Scale-space filtering", Proc. 8th Int. Joint Conf. Art. Intell., 1983, pp. 1019-1022, Karlsruhe, Germany.

S. Mallat, "A Theory for Multiresolution Signal Decomposition: The Wavelet Representation," IEEE Transactions on Pattern Analysis and Machine Intelligence, 1989.

S. Simske, "Evaluating Compression and/or Resampling Approaches for Counterfeit Image Detection", IEEE ICIP 2008.

M. Gaubatz, et al.; "On the Nearly Scale-Independent Rank Behavior of Image Quality Metrics"; IEEE ICIP 2008.

A. Patti et al., "Automatic Digital Redeye Reduction," 1998 IEEE; pp. 55-59.

Benjamin D. Zarit, Boaz J. Super, and Francis K.H. Quek, "Comparison of Five Color Models in Skin Pixel Classification", Electrical Engineering and Computer Science, University of Illinois at Chi., Jun. 2002, pp. 1-6.

Erik Vlietinck, "EFI Fiery System 9 Release 2 RIP", Retrieved from http://printing.it-enquirer.com/media/Fiery-System9.pdf, 2009.

F. Gasparini et al., "Chapter 1—Automatic Red Eye Removal for Digital Photography," in publication entitled "Single-Sensor Imaging: Methods and Applications for Digital Cameras" 35pgs, 2008.

H. Luo et al., "An Efficient Automatic Redeye Detection and Correction Algorithm," 4 pgs., 2004.

Huitao Luo, Jonathan Yen, and Dan Tretter, "An Efficient Automatic Redeye Detection and Correction Algorithm", Hewlett Packard Labs, pp. 1-4, Aug. 2004.

J. Willamowski et al., "Probabilistic Automatic Red Eye Detection and Correction," 2006 IEEE; 4 pgs.

Jay S. Schildkraut and Robert T. Gray, "A Fully Automatic Redeye Detection and Correction Algorithm", IEEE, Dec. 2002, vol. 1, pp. I-801-I-803.

L. Zhang et al., "Automated Red-Eye Detection and Correction in Digital Photographs," Oct. 24-27, 2004; 4 pgs.

M. Gaubatz et al., "Automatic Red-Eye Detection and Correction," 2002 IEEE; pp. 804-807.

Michael J. Jones and James M. Rehg "Statistical Color Models with Application to Skin Detection", Cambridge Research Laboratory, pp. 1-23, Nov. 2004.

Renato Keshet, et al., Automatic Photo Enhancement Server (HIPIE 2), pp. 1-6, Feb. 2009.

Robert Ulichney, Mathew Guabatz, and JM Van Thong, "RedBot—a tool for improving red-eye correction", Abstract, Jan. 2004.

STOIK Imaging, product website availabe at <<http://www.stoik.com/products/photo/STOIK-Imagic/>>; 1994-2010; 2 pgs.

The International Search Report and the Written Opinion of the International Searching Authority for International App No. PCT/US2008/072010 dated Jan. 12, 2009, 11 pages.

Ulichney et al., "Perceptual-Based Correction of Photo Red-Eye," Aug. 2005; 6 pgs.

Xerox Corporation, "Xerox FreeFlow® Print Server", Retrieved from http://www.zahrala.com/FFPS_Brochure_US_single_pgs.pdf, 2007.

International Preliminary Report on Patentability received in PCT Application No. PCT/US2008/072010; Feb. 10, 2011; 6 pages.

ArcSoft, Inc., "ArcSoft Mediaimpression for Kodak Video Cameras," User Manual, excerpts, 2010, pp. 1-5, 22, 33, 41, 62.

Eastman Kodak Company, "Better Pictures, More Choices through Kodak DLS Software and Accessories," 2002, 4 pages.

Pixoogy, "Red-Eye Removal," available Apr. 2003, pp. 1-2.

Yen et al., "Redeye selection in semiautomatic mode," Research Disclosure, May 2005, p. 546.

* cited by examiner

IMPLEMENTING CONSISTENT BEHAVIOR ACROSS DIFFERENT RESOLUTIONS OF IMAGES

BACKGROUND

Digital photo management comprises management tasks and decisions surrounding the upload, annotation, cataloging, storage, retrieval, and distribution of digital images, and products associated with digital photo management. Digital photo management is recognized as a growing market due to the general increase in interest in digital photography. Systems that provide digital photo management allow digital images to be displayed to a user at various resolutions. For example, a digital photo management system may display digital images as icons, thumbnail images, edited images, previewed images, and printed images, among others, at various resolutions.

However, because these digital photo management systems also allow for image enhancement or editing of digital images, changes a user may make to the digital image may not be represented accurately at different resolutions and sizes on a display device or may not be represented accurately in a print of the image.

For example, when utilizing red-eye removal functionalities in such a digital photo management system, each removal process may result in highly targeted changes to be made to a digital image based on what artifacts are detected in the digital image at a given resolution. When the image is displayed to a user at different resolutions or printed on a medium, the same targeted changes may not be accurately represented in the differently-sized images, and in the print of the image. Thus, the user's expectations of what the altered image should look like may not be realized when the image is displayed at these different resolutions or in the printed image. This effect, in turn, causes the value of the digital photo management system and the quality of the printed product to diminish in the marketplace.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
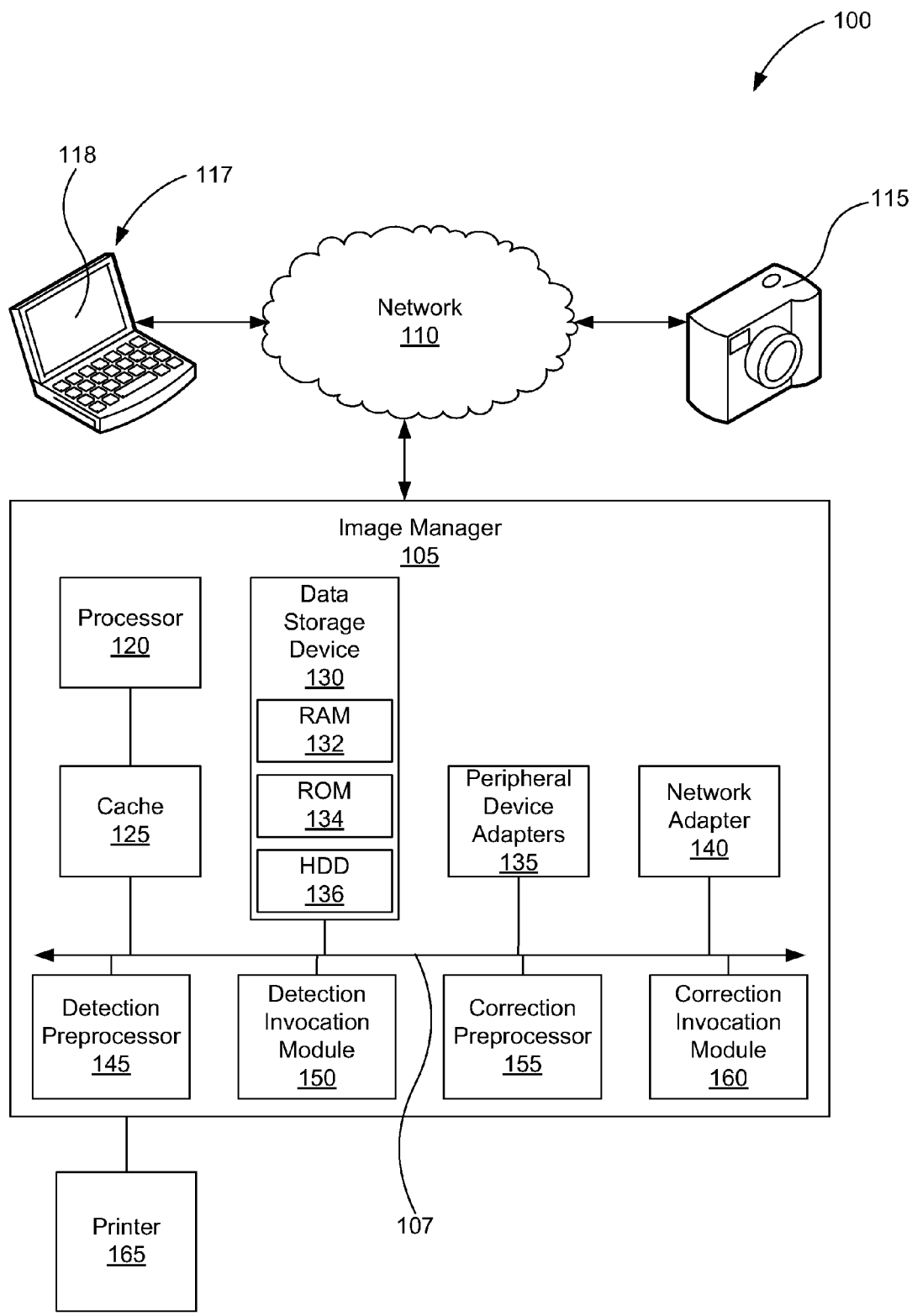
FIG. 1 is a block diagram of a digital photo management system, according to one example of the principles described herein.

The digital photo management system and method described herein accurately and consistently represents image enhancement operations applied to digital images regardless of the size or resolution at which the images are displayed as output such as, for example, on a display of a computing device, or as a printed image. As described above, a user may be presented on a display of a computing device with an image to which he or she desires to make enhancements. However, once an enhancement has been made to an image in, for example, an editing pane of a digital photo management system, the enhancements may not be represented accurately in, for example, thumbnails or icons of the image with different resolutions and different sizes.

In one example associated with a red-eye removal process, each red-eye removal process includes highly targeted changes made to the image based on what artifacts are detected in the image with a given resolution. When the image is displayed or printed at different resolutions and sizes by the digital photo management system, the same targeted changes should be represented accurately in the images at these resolutions and sizes. Further complications occur when the digital photo management system allows a user to undo the effects of any image enhancements. This lack of consistent behavior among images at different resolutions and sizes is addressed by creating a robust, multi-scale image enhancement process. The present digital photo management system and method provide a solution based on the combination of face detection and face-based artifact detection that attempt to enforce consistent behavior across different image scales.

The digital photo management system and method described herein operates using a number of elements comprising the following: a detection preprocessing module, a detection invocation module, a correction pre-processing module, and a correction invocation module. The detection preprocessing module provides a representation of an image that yields consistent results from image analysis operations, such as red-eye detection, across differently sized images, regardless of what other enhancements have been applied to the image already. The detection invocation module selects an image analysis operation that has been optimized for the input image size, previously applied enhancements, use case, and available computational resources. The correction pre-processing module transforms the output of the detection preprocessing module and the detection invocation module in order to compensate for any image enhancements specified by a user or any part of the system that inspected the digital image. The correction invocation module produces a corrected image where the artifacts affected by the image enhancement operations (e.g., red-eye artifacts) are corrected for that image displayed at the new resolution.

As used in the present specification and in the appended claims, the term "digital photo management" or similar language is meant to be understood broadly as actions comprising, for example, management tasks and decisions with regard to the upload, annotation, cataloging, storage, retrieval, and distribution of digital images. Similarly, as used in the present specification and in the appended claims, the term "digital photo management system" is meant to be understood broadly as a system of devices used for downloading, uploading, editing, enhancing, renaming, backing up, rating, grouping, archiving, optimizing, maintaining, thinning, exporting files, and combinations of thereof, among others.

Further, as used in the present specification and in the appended claims, the term "image enhancement" or similar language is meant to be understood broadly as any amendment made to the data of an image. Some examples of image enhancements include, red-eye removal processes, orientation of an image, image size alterations, removal of unwanted elements in the image, gamma correction processes, color enhancement processes, cropping processes, and contrast adjustment processes, among others. In another example, the image enhancement is any alteration made to the data of the image that is not independent of the resolution of the image as displayed on a display device or printed.

In yet another example, the image enhancement is any amendment made to the data of the image that involves segmentation of the image or image data. In this example, segmentation of an image comprises partitioning a digital image into multiple segments such as, for example, groups of pixels. In this manner, the segmentation process creates groups of pixels that are similar with respect to some characteristic such as color, intensity, or texture, among others. By using segmentation of an image, certain portions of the image can be isolated and enhanced.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to FIG. 1, a block diagram of a digital photo management system (100), according to one example of the principles described herein, is depicted. The digital photo management system (100) comprises an image manager (105) communicatively coupled to a client computer (117) and an image capture device (115) via a network (110), and a printer (165) communicatively coupled to the image manager (105). Each of these elements will now be discussed in more detail below.

In the present example, for the purposes of simplicity in illustration, the image manager (105), client computer (117), image capture device (115), and printer (165) are separate computing devices communicatively coupled to each other through the network (110) or other communication paths. However, the principles set forth in the present specification extend equally to any alternative configuration in which a number of these elements are combined in a number of configurations. As such, examples within the scope of the principles of the present specification include examples in which the image manager (105), client computer (117), image capture device (115), and printer (165) are implemented by the same computing device. Other examples of an alternative configuration include examples in which the functionality of the image manager (105) is implemented by multiple interconnected computers, for example, a server in a data center and a user's client machine. Still other examples of alternative configurations of the elements of FIG. 1 include examples in which a number of the image manager (105), client computer (117), image capture device (115), and printer (165) communicate directly through a bus without intermediary network devices.

The image manager (105) of the present example retrieves image data from a number of sources such as, for example, the image capture device (115) or the client computer (117), and generates and outputs an image to an output device such as, for example, the display of the client computer (117) or the printer (165). In the present example, this task is accomplished by the image manager (105) requesting the image data from the image capture device (115) or the client computer (117) over the network (115) using the appropriate network protocol, for example, Internet Protocol ("IP").

In another example, the image manager (105) requests image data contained within other data storage devices such as, for example, data storage device (130). Illustrative processes regarding generation and output of image data are set forth in more detail below. In one example, the image manager (105) is the SNAPFISH® web-based photo sharing, editing, and printing service owned by HEWLETT-PACKARD®, and located at www2.snapfish.com. In this example, a user uploads image data from the user's image capture device (115) or client computer (117) via the network (110).

To achieve its desired functionality, the image manager (105) includes various hardware components. Among these hardware components are a processor (120), a cache memory (125), a data storage device (130), peripheral device adapters (135), and a network adapter (140). These hardware components may be interconnected through the use of a number of busses and/or network connections. In one example, the processor (120), cache (125), data storage device (130), peripheral device adapters (135), and network adapter (140) are communicatively coupled via bus (107).

The processor (120) comprises the hardware architecture for retrieving executable code from the data storage device (130) and executing the executable code. The executable code, when executed by the processor (120), causes the processor (120) to implement at least the functionality of generating and outputting image data in order to provide an accurate and consistent representation of image enhancement operations as applied to the digital images regardless of the size or resolution at which the images are displayed on an output device according to the methods of the present specification described below. In the course of executing code, the processor (120) may receive input from and provide output to a number of the remaining hardware units.

In one example, the image manager (105), and, specifically, the processor (120) accesses image data within the data storage device (130), the client computer (117) or the image capture device (115), applies a number of enhancement operations, and presents the data to a user via a display (118) of the client computer (117). The processor (120), in one example, presents the user with a user interface on the display (118) of the client computer (117). The display (118) is any number of devices that provide a representation of, for example, an image to a user. In one example, the display (118) is a display device such as a cathode ray tube, a plasma display, or a liquid crystal display, among others.

The data storage device (130) stores data that is processed and produced by the processor (120). As discussed above and in more detail below, the data storage device (130) also saves data including, for example, image data, altered image data, or combinations thereof. In one example, all of this data is stored in the form of a sorted database for easy retrieval. The data storage device (130) includes various types of memory modules, including volatile and nonvolatile memory. For example, the data storage device (130) of the present example includes random access memory (RAM) (132), read only memory (ROM) (134), and a hard disk drive (HDD) (136) memory. Many other types of memory may be employed, and the present specification contemplates the use of many varying type(s) of memory in the data storage device (130) as may suit a particular application of the principles described herein. In certain examples, different types of memory in the data storage device (130) may be used for different data storage needs. For example, in certain examples the processor (120) may boot from ROM (134), maintain nonvolatile storage in the HDD (136) memory, and execute program code stored in RAM (132).

Generally, the data storage device (130) may comprise a computer readable storage medium. For example, the data storage device (130) may be, but not limited to, an electronic, magnetic, optical, electromagnetic, infrared, or semiconductor system, apparatus, or device, or any suitable combination thereof. More specific examples of the computer readable storage medium may include, for example, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable medium may be any tangible medium that can contain, or store a program for use by or in connection with an instruction execution system, apparatus, or device such as, for example, the processor (120). In another example, a computer readable storage medium may be any form of non-transitory medium.

The peripheral device adapters (135) and network adapter (140) in the image manager (105) enable the processor (120) to interface with various other hardware elements, external and internal to the image manager (105). For example, peripheral device adapters (135) provide an interface to input/output devices, such as, for example, the printer (165). Further, the peripheral device adapters (135) create a user interface and/or access to external sources of memory storage, such as, for example, data stored on the client computer (117) or the image capture device (115).

Peripheral device adapters (135) may also create an interface between the processor (120) and the printer (165) or other media output device. For example, where the image manager (105) generates and outputs image data in order to provide an accurate and consistent representation of image enhancement operations as applied to the digital images regardless of the size or resolution at which the images are displayed on an output device, and the user then wishes to then print the image data as enhanced, the image manager (105) instructs the printer (165) to create a number of physical copies of the image data.

A network adapter (140) may additionally provide an interface to the network (110), thereby enabling the transmission of data to and receipt of the data from other devices on the network (110), including, for example, the client computer (117) and the image capture device (115). In one example, the network (110) comprises two or more computing devices communicatively coupled. Further, the network (115) comprises, for example, a local area network (LAN), a wide area network (WAN), a virtual private network (VPN), and the Internet, among others types of networks.

Referring again to FIG. 1, the image capture device (115) comprises any device capable of capturing a digital image and transmitting image data representing the digital image to another device. In one example, the image capture device (115) is a digital camera, a video camera, and a charge-coupled device (CCD), among others. The image data transmitted by the image capture device (115) is any data representing an image capable of printing. The image data, in one example, is encoded as a bit map, a TIFF image, a JPEG image, a GIF image, or any other image capable of being printed by, for example, the printer (165). Further, in another example, the image data (110) is encoded in any of the various print control languages that instruct printers in the production of documents.

The printer (165) is any device capable of producing a printed image based on the image data obtained from the client computer (117), image capture device (115), or data storage device (130), among other sources. Examples of the printing device (165) comprise a laser printer, an LED printer, inkjet printer, and a digital printing press, among others.

Figure 2:
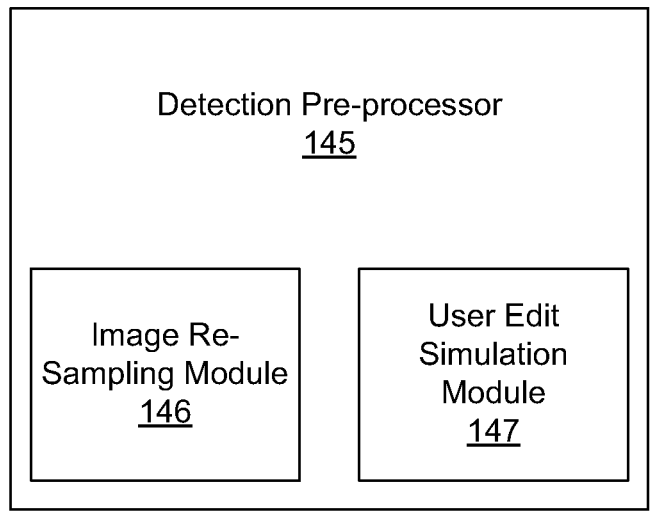
FIG. 2 is a block diagram of a detection preprocessor, according to one example of the principles described herein.
Figure 3:
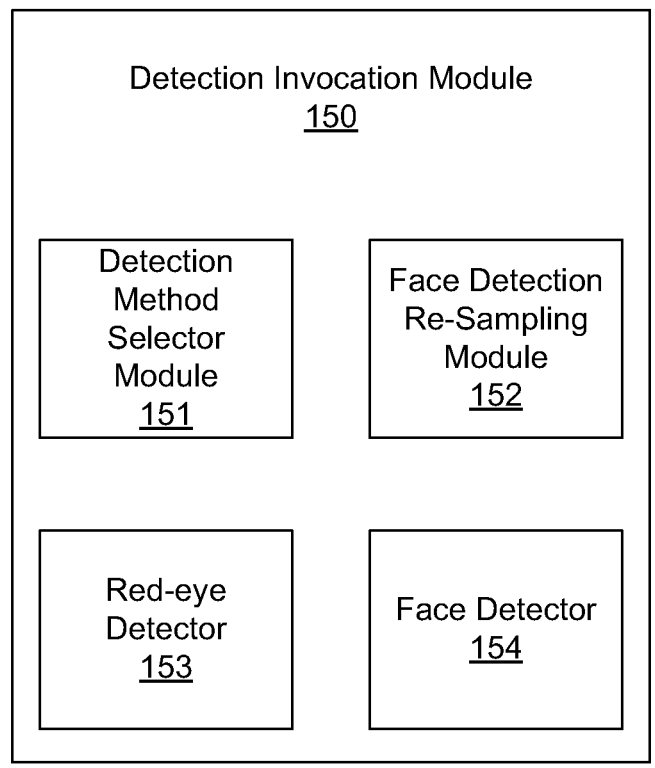
FIG. 3 is a block diagram of a detection invocation module, according to one example of the principles described herein.

The system of FIG. 1 further comprises a detection preprocessor (145), a detection invocation module (150), a correction preprocessor (155), and a correction invocation module (160). Each of these elements will now be discussed in more detail with reference to FIGS. 1 through 5. With reference to FIG. 2 specifically, a block diagram of a detection preprocessor (145), according to one example of the principles described herein, is depicted. The detection preprocessor (145) provides a representation of an image that yields consistent image analysis performance across differently sized images, regardless of what other enhancements have already been applied or may be applied. More specifically, the detection preprocessor (145) approximates image enhancements performed by the user previous to a switch from one viewed resolution of the image to another resolution.

The detection preprocessor (145) comprises an image re-sampling module (146) and a user edit simulation module (147). The image re-sampling module (146) re-samples image data obtained from the data storage device (130) of the image manager (105), the client computer (117), or image capture device (115). The image re-sampling module (146) utilizes any interpolation or filtering technique that does not interfere with the overall desired result. In one example the image re-sampling technique utilized by the image re-sampling module (146) is a bilinear interpolation technique followed by a Gaussian convolution filter. In another example, the image re-sampling module (146) utilizes a bi-cubic re-sampling technique followed by area averaging convolution filter.

The detection invocation module (150) selects an image enhancement operation that has been optimized for the input image size, previously applied enhancements, use case, and available computational resources. The correction preprocessor (155) transforms the output of the detection invocation module (150) in order to compensate for any image enhancement operations specified by a user or any part of the system that inspected the image. The correction invocation module (160) produces a corrected image where artifacts within the corrected image have been corrected based on the image analysis operation performed in the detection invocation module (150). More details regarding these elements will now be described in connection with FIGS. 2 through 6.

Figure 6:
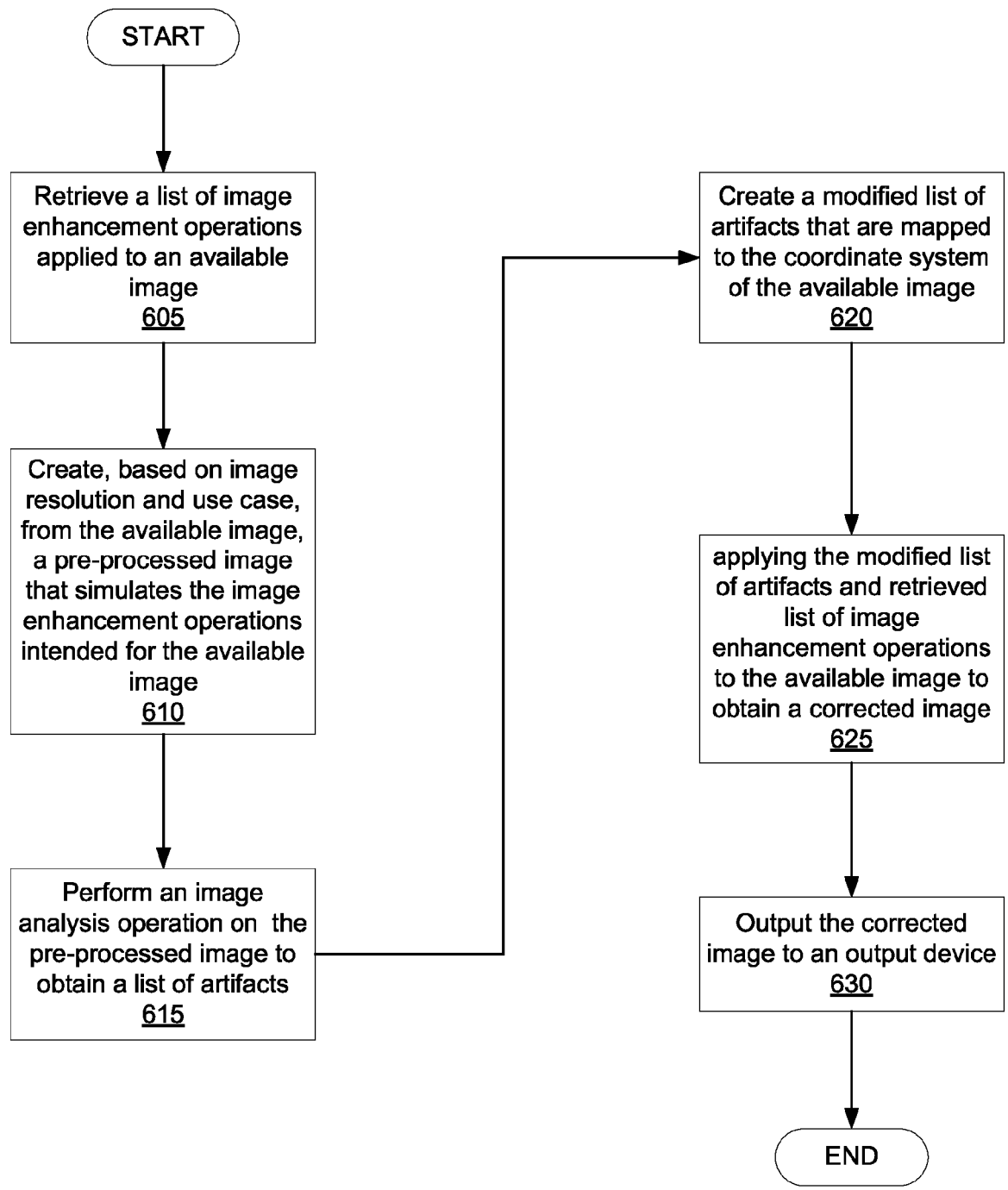
FIG. 6 is a flowchart showing a method of implementing consistent behavior across different resolutions of images, according to one example of the principles described herein.

FIGS. 2 through 5 are block diagrams of a detection preprocessor, a detection invocation module, a correction preprocessor, and a correction invocation module, respectively, according to one example of the principles described herein. Further, FIG. 6 is a flowchart showing a method of implementing consistent behavior across different resolutions of images, according to one example of the principles described herein. The method (600) of FIG. 6 begins by the detection pre-processor (145) retrieving (block 605) a list of image enhancement operations applied to an available image. In one example, the available image has image enhancement operations applied to it by a user prior to implementation of the method (600). In this example, the image enhancement operations applied to the available image may include a red-eye removal process, an orientation of the available image, an alteration of the size of the available image, removal of unwanted elements in the available image, a gamma correction process, a color enhancement process, a cropping process, a contrast adjustment process, or combinations thereof. In this manner, the available image input to the detection pre-processor (145) is a user-edited version of the available image. Since this method can be used to modify any resolution dependent operation to produce a resolution independent version, the previous list of edits may have independently applied this method to improve their results.

Further, the list of image enhancement operations associated with (block 605) the available image are exact representations of the image enhancement operations made to the available image. For example, if the user rotated the image by 87.5 degrees before the method (600) begins, then the exact angle at which the image was rotated would be stored in a record. The record stores this information in, for example, the data storage device (130) of the image manager (105) as metadata along with image data representing the available image. Other aspects of the exact image enhancement operations and simulated image enhancement operations will be discussed in more detail below. In one example, because it may not be advantageous to recreate the same set of prescribed image enhancement operations due to limitations on computational resources or available information, this module performs an approximate version or simulation of these changes as described in more detail below.

In one example, the image manager (105) creates a record of any image enhancements applied to the image by a user or through an automated image enhancement operation. This record is retrieved such that the image manager (105) can apply the same changes to the image prior to red-eye removal, as will be described in more detail below.

Further, in one example, the available image is a high resolution image uploaded to the image manager (105) by a user. In this example, the uploaded image may be a 2,000 by 2,000 or 4 megapixel image. In other examples, the uploaded image has a resolution of between approximately a 1 megapixel and a 40 megapixels. However, an image of any resolution may be uploaded to the image manager (105) for processing. Once the original image is uploaded to the image manager (105), the image may be re-sampled to any number of different resolutions, prior to the application of the method (600) herein.

In one example, an original image is re-sampled to an 800 by 800 pixel image by the image manager (105). This 800 by 800 re-sampled image may be used, for example, in displaying thumbnail versions of the original image. In another example, an original image is re-sampled by the image manager (105) to a 96 by 96 pixel image. This 96 by 96 re-sampled image may be used, for example, in displaying icon versions of the original image. The detection pre-processor (145) and the subsequent stages of the method (600) have access to different combinations of these re-sampled images when the method (600) is invoked. Accordingly, the image re-sampling module (146) may re-sample an image at any resolution to compensate for these differences, and in order to promote consistent results, as will be described in more detail below.

After the detection pre-processor (145) retrieves (block 605) a list of image enhancement operations specified for the available image, the image re-sampling module (146) of the detection pre-processor (145) re-samples the available image at a resolution of, for example, 800 by 800 pixels. If, however, the available image uploaded by the user to the image manager (105) has a resolution equal to or is lesser than the resolution at which the re-sampling occurs, then, in one example, the image re-sampling module (146) does not re-sample the image but processes the available image at the resolution at which it was uploaded.

Based on the re-sampled image of the available image, the user edit simulation module (147) of the detection pre-processor (145) creates (block 610) a pre-processed image that simulates the image enhancement operations specified for the available image. In one example, if the user applied image enhancement processes, and, for example, rotated the available image by 87.5 degrees and applied a color enhancement process, some combination of these image enhancement operations would be simulated in the pre-processed image by the user edit simulation module (147). In this example, simulation of the rotation of the available image, for example, would be performed such that the image rotation would be rounded to the nearest 90 degrees. Thus, in this example, if the user rotated the available image by 87.5 degrees, the simulation would round up and rotate the image by 90 degrees. By simulating the exact image enhancement operations the user made to the available image in the pre-processed image, the process is able to perform faster, provide real-time results, and using a relatively lower amount of computer resources.

A modified list of image enhancement operations is created based on the simulated image enhancement operations applied to the pre-processed image. This modified list of image enhancements is used for later processing as will be discussed below.

After the detection pre-processor (145) creates (block 610) a pre-processed image and obtains a modified list of image enhancements, the detection invocation module (150) of the image manager (105) performs (block 615) an additional image analysis operation to the pre-processed image of the pre-processed image to obtain a list of artifacts. In doing this, the face detection re-sampling module (152) of the detection invocation module (150) re-samples the pre-processed image for efficiency and improved robustness. For example, if a red-eye detection process is the additional image enhancement process to be performed, a face detection process may also be performed to detect the faces within the image. In this example, the face detector (154) may operate optimally at a resolution of 400 by 400 pixels. The face detection re-sampling module (152) re-samples the pre-processed image to a 400 by 400 resolution image.

In another example, the face detection re-sampling module (152) modifies the degrees of re-sampling chosen by limiting the ways in which sampling can be applied for smaller images. In one example, when the images input into the face detection re-sampling module (152) are above a predetermined resolution, the face detector (154) processes images that have been re-sampled to a constant size. However, when the images comprise a relatively lower resolution or a resolution lower than the predetermined resolution, the down-sampling factors are constrained to include powers of 2, for example.

After the face detection re-sampling module (152) re-samples the pre-processed image, a face detector (154) detects a number of faces within the re-sampled image, and stores information regarding the detected faces. In order to use the locations of faces detected in the 400 by 400 pixel image to understand the 800 by 800 pixel image, the detection pre-processor (145) converts the pixel coordinates describing the locations of the detected faces to a different coordinate system. In doing so, the regions detected by the face detector are mapped from the 400 by 400 pixel re-sampled image to the 800 by 800 pixel image, such that any subsequent analysis operation applied to the 800 by 800 pixel image can use this information to constrain the search for regions of interest, such as red-eye artifacts, to locations within the detected faces. Coordinates describing the face regions are stored for possible later use.

A detection method selector module (151) determines the best red-eye detector (153) operation to use for detecting red-eye within the pre-processed image within the faces located by the face detector. The detection method selector module (151) determines the best red-eye detector operation to employ by considering which image enhancement operations were applied to the available image. In considering this information, the detection method selector module (151) chooses a red-eye detector (153) that is trained to deal with images modified by these originally employed image enhancement operations. The detection method selector module (151) selects the best detection operation by configuring parameters for the red-eye detector (153) that tune it for application to the pre-processed image.

Once the detection method selector module (151) chooses a red-eye detector (153), the red-eye detector (153) detects red-eye artifacts in the pre-processed image, creates a list of red-eye artifacts, and stores the list for later processing. Thus, generally, the detection invocation module (150) detects artifacts within the pre-processed image, and creates and stores a list of the artifacts for later processing.

Figure 4:
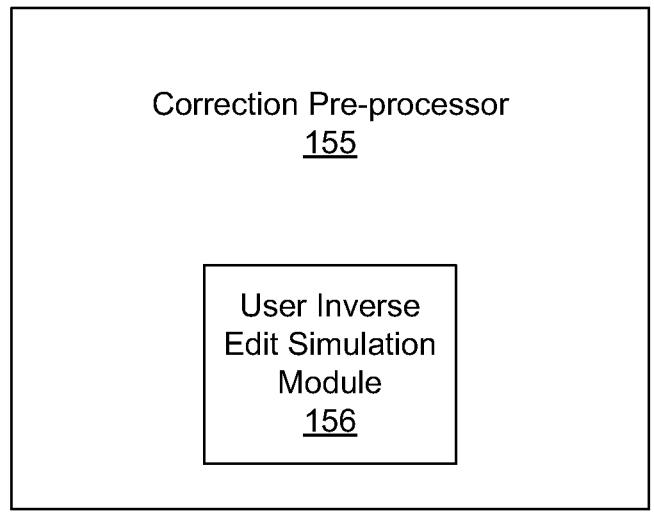
FIG. 4 is a block diagram of a correction preprocessor, according to one example of the principles described herein.
Figure 5:
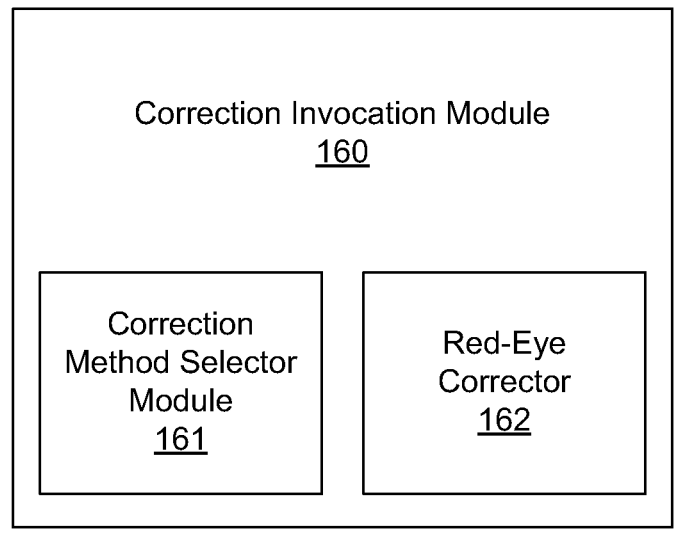
FIG. 5 is a block diagram of a correction invocation module, according to one example of the principles described herein.

The correction pre-processor (155) of the image manager (105) then creates (block 620) a modified list of artifacts that are mapped to the coordinate system of the available image. As depicted in FIG. 4, the correction pre-processor (155) comprises an inverse user edit simulation module (156). The correction pre-processor (155) takes as input an available image, the list of image enhancement operations obtained from the detection pre-processor (145) at block 605, and the list of artifacts obtained from the detection invocation module (150) at block 615. The correction pre-processor (155) transforms the output of the detection invocation module (150) in order to compensate for any enhancements specified by a user intended for the image or any part of the system that inspected the image. The operations involved are a function of the resolution of the available image and the image enhancement operations applied. In one example, the correction pre-processor (155) is used to de-rotate the coordinates describing the detected artifact to match the coordinate system in the available image.

In another example, the correction pre-processor (155) performs the process described at block 620 by mapping the coordinates associated with the red-eye artifacts processed at block 615 describing artifacts in an 800 by 800 pixel image used by the red-eye detector (153) to a set describing the same artifacts in a 2,000 by 2,000 pixel available image. In this manner, a modified list of artifacts is created.

Next, the correction invocation module (160) applies (block 625) the modified list of artifacts and retrieved list of image enhancement operations to the available image to obtain a corrected image. In this manner, and in the above example employing red-eye detection, the correction invocation module (160) produces a final image of 2,000 by 2,000 pixels where red-eye artifacts have been corrected. The correction method selector module (161) determines a red-eye correction method that is designed for an image with or without histogram stretching, or some other luminance altering enhancement. Thus, much like the detection method selector module (151) of the detection invocation module (150), the correction method selector module (161) determines the most efficient image enhancement operation to employ by considering the resolution of the available image, previously applied image enhancement operations, use case, and available computational resources.

In one example, the correction method selector module (161) determines that the red-eye corrector (162) of the correction invocation module (160) is the most efficient image enhancement operation. Thus, the red-eye corrector (162) corrects the available image based on the correction configuration data provided by the correction method selector module (161). In this manner, a corrected image without red-eye artifacts is produced.

After the correction invocation module (160) corrects the image, the corrected image is output (block 630) to an output device. In one example, the corrected image is output (block 630) to the display (118) of the client computer (117) or other display device for displaying the corrected image to a user. In another example, the corrected image is output (block 630) to the printer (165) in order to produce a printed image based on the corrected image data obtained from the correction invocation module (160). In one example, the image to which the corrections are applied and printed by the printer (165) is an image based on raw image data. In this example, the corrections that are to be made to the corrected image are displayed on the display (118) of the client computer (117), but the changes made to the image for printing are made to the raw image data as originally uploaded to the image manager (105) at print time.

The methods described above may be accomplished in conjunction with a computer program product comprising a computer readable medium having computer usable program code embodied therewith that, when executed by a processor, performs the above methods. Specifically, the computer program product implements consistent behavior of an image enhancement operation across different resolutions of images.

The specification and figures describe a method of implementing consistent behavior across different resolutions of images. The system retrieves a list of image enhancement operations applied to an available image, creates a pre-processed image that simulates the image enhancement operations specified for the available image, performs an image analysis operation on the pre-processed image to obtain a list of artifacts, and creates a modified list of artifacts that are mapped to the coordinate system of the available image. The system then applies the modified list of artifacts and extracted list of image enhancement operations to the available image to obtain a corrected image, and outputs the corrected image to an output device.

This system and method for implementing consistent behavior across different resolutions of images may have a number of advantages, including that it: 1) allows artifacts to be computed on the fly whenever a corrected image is requested; 2) eliminates the need for storing, managing and transforming of lists of targeted changes to be applied, as well as the storing of versions of images with permanent changes; 3) provides red-eye removal support in a system with multiple other enhancements, each of which can affect red-eye detection and correction; 4) promotes robust red-eye removal performance across different image scales; 5) successfully balances speed, detection rate and consistency of a face detector, a component of many red-eye detection schemes that often accounts for the majority of the computation time; 6) allows the photo management system to reduce computation by processing the smallest available version of an image for a particular red-eye removal task; 7) simplifies system design and enables code reuse by invoking the same routines for different image resolutions regardless of the nature of the red-eye removal task; 8) is applicable with any red-eye detection scheme (automatic, manual, or otherwise) or face detection component; and 9) locates faces, the locations of which can be stored for faster computation during future invocations of the face detection procedure. Further, the digital photo management system described herein allows different types of image edits and enhancements to be applied to an image in an unspecified schedule or order, produces modified representations of the image that incorporate all the user's edits and enhancements for different specific tasks, and can access raw data that represents an image that exists without some subset of the applied enhancements.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of implementing consistent behavior across different resolutions of images comprising:
retrieving a list of previously specified image enhancement operations for an available image;
creating, based on image resolution and use case, from the available image, a pre-processed image that simulates the image enhancement operations intended for the available image;
performing an image analysis operation on the pre-processed image to obtain a list of artifacts;
creating a modified list of artifacts that are mapped to the coordinate system of the available image; and
applying the modified list of artifacts to the available image.

2. The method of claim 1, in which retrieving a list of image enhancement operations applied to an available image comprises:
retrieving exact representations of the image enhancement operations specified for the available image;
creating approximate versions of the image enhancement operations specified for the available image; and
creating a modified list of image enhancement operations based on the approximate versions of the image enhancement operations.

3. The method of claim 1, in which performing an image analysis operation on the pre-processed image to obtain a list of artifacts comprises:
determining detection configuration data for the image analysis operation based on which image enhancement operations were intended for the available image; and
performing the image analysis operation based on the detected configuration data to detect coordinates of a number of artifacts.

4. The method of claim 3, in which determining detection configuration data for the image analysis operation is further based on an image enhancement operation that is optimized for the resolution of the pre-processed image, the situation in which the configuration will be utilized, and available computational resources.

5. The method of claim 3, in which the image analysis operation is a red-eye removal operation, and the method further comprises:
applying a face detector to detect a number of faces in a re-sampled version of the pre-processed image;
storing information regarding coordinates of the detected faces within the second re-sampled image of the pre-processed image;
mapping the coordinates of the detected faces within the re-sampled version of the pre-processed image to coordinates within the pre-processed image;
performing the red-eye detection operation on the pre-processed image to obtain coordinates of a number of red-eye artifacts; and
storing information regarding the coordinates of the red-eye artifacts.

6. The method of claim 1, wherein applying the modified list of artifacts further comprises applying the retrieved list of image enhancement operations to the available image to obtain a corrected image and outputting the corrected image to an output device.

7. The method of claim 6, in which applying the modified list of artifacts and retrieved list of image enhancement operations to the available image to obtain a corrected image comprises:
determining an image analysis operation to apply to the available image based on an image enhancement operation that is optimized for the resolution of the available image, the situation in which the configuration will be utilized, and available computational resources.

8. The method of claim 6, in which outputting the corrected image to an output device comprises:
outputting the corrected image to a printing device, and printing the corrected image.

9. A system for rendering an edited image at a number of resolutions, comprising:
an image manager;
an image source communicatively coupled to the image manager that uploads digital images to the image manager; and
an output device,
in which the image manager comprises:
a detection preprocessor to retrieve a list of image enhancement operations previously specified for an available image and creates, based on image resolution and use case, a pre-processed image that simulates the image enhancement operations specified for the available image;
a detection invocation module to perform an image analysis operation on the pre-processed image to obtain a list of artifacts, where the analysis operation is selected based on image resolution and use case;
a correction preprocessor to create a modified list of artifacts that are mapped to the coordinate system of the available image; and
a correction invocation module to apply the modified list of artifacts to the available image.

10. The system of claim 9, in which the image source is an image capture device communicatively coupled to the image manager via a network.

11. The system of claim 9, in which the output device is a display device that displays the corrected image.

12. The system of claim 9, in which the output device is a printing device that prints the corrected image.

13. The system of claim 9, wherein the correction invocation module is further to apply the extracted list of image enhancement operations, with the modified list of artifacts, to the available image to obtain a corrected image.

14. A computer program product for implementing consistent behavior across different resolutions of images, the computer program product comprising:
a non-transitory computer readable medium having computer usable program code embodied therewith, the computer usable program code comprising:
computer usable program code to, when executed by a processor, retrieve a list of image enhancement operations applied previously to the available image;
computer usable program code to, when executed by a processor, create, from the available image, a pre-processed image that simulates the image enhancement operations previously specified for the available image;
computer usable program code to, when executed by a processor, perform an image analysis operation on the pre-processed image to obtain a list of artifacts;

computer usable program code to, when executed by a processor, create a modified list of artifacts that are mapped to the coordinate system of available image; and computer usable program code to, when executed by a processor, apply the modified list of artifacts to obtain a corrected image.

15. The computer program product of claim 14, further comprising computer usable program code to, when executed by a processor, output the corrected image to an output device.

16. The computer program product of claim 14, further comprising:

computer usable program code to, when executed by a processor, retrieve exact representations of the image enhancement operations made to the available image;

computer usable program code to, when executed by a processor, approximate versions of the image enhancement operations made to the available image; and computer usable program code to, when executed by a processor, create a modified list of image enhancement operations based on the approximate versions of the image enhancement operations.

17. The computer program product of claim 16, further comprising:

computer usable program code to, when executed by a processor, determine detection configuration data for the image analysis operation based on which image enhancement operations were associated with the available image; the resolution of the pre-processed image, the situation in which the configuration will be utilized, and available computational resources.

18. The computer program product of claim 16, in which the computer program product further comprises:

computer usable program code to, when executed by a processor, detect a number of faces in a re-sampled version of the pre-processed image;

computer usable program code to, when executed by a processor, store information regarding coordinates of the detected faces;

computer usable program code to, when executed by a processor, map the coordinates of the detected faces to the coordinate system of the pre-processed image;

computer usable program code to, when executed by a processor, perform the image analysis operation on the pre-processed image to obtain coordinates of a number of artifacts; and computer usable program code to, when executed by a processor, store information regarding the coordinates of the artifacts.

19. The computer program product of claim 14, in which the image analysis operation is a red-eye detection operation, and in which the computer program product further comprises:

computer usable program code to, when executed by a processor, perform the red-eye detection operation on the pre-processed image to obtain coordinates of a number of red-eye artifacts; and computer usable program code to, when executed by a processor, store information regarding the coordinates of the red-eye artifacts.

20. The computer program product of claim 16, in which the computer program product further comprises:

computer usable program code to, when executed by a processor, determine an image enhancement operation to apply to the available image based on an image enhancement operation that is optimized for the resolution of the available image, the situation in which the configuration will be utilized, and available computational resources.

* * * * *